United States Patent
Do et al.

(10) Patent No.: US 12,063,587 B2
(45) Date of Patent: Aug. 13, 2024

(54) OPERATING METHOD OF TERMINAL AND TERMINAL

(71) Applicant: Samsung Electronics Co., Ltd., Suwon-si (KR)

(72) Inventors: Joohyun Do, Seoul (KR); Sungyoon Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 528 days.

(21) Appl. No.: 17/060,694

(22) Filed: Oct. 1, 2020

(65) Prior Publication Data

US 2021/0306935 A1 Sep. 30, 2021

(30) Foreign Application Priority Data

Mar. 24, 2020 (KR) .................. 10-2020-0035817

(51) Int. Cl.
*H04W 48/16* (2009.01)
*H04W 84/04* (2009.01)

(52) U.S. Cl.
CPC .......... *H04W 48/16* (2013.01); *H04W 84/042* (2013.01)

(58) Field of Classification Search
CPC .............................. H04W 48/16; H04W 84/042
USPC ....................................................... 370/328
See application file for complete search history.

(56) References Cited

U.S. PATENT DOCUMENTS

| | | | |
|---|---|---|---|
| 6,925,311 B2 | 8/2005 | Rudolf | |
| 9,078,146 B2 | 7/2015 | Gorokhov et al. | |
| 9,247,491 B2 | 1/2016 | Drugge et al. | |
| 9,432,922 B1 | 8/2016 | Song et al. | |
| 9,609,585 B1* | 3/2017 | Markovic | H04W 48/20 |
| 9,763,177 B1 | 9/2017 | Baskaran et al. | |
| 9,877,270 B2 | 1/2018 | Hayes et al. | |
| 10,136,405 B2 | 11/2018 | Song et al. | |
| 10,299,147 B2 | 5/2019 | Xu et al. | |
| 2003/0169703 A1 | 9/2003 | Tamura | |
| 2010/0330989 A1* | 12/2010 | Song | H04W 48/16 455/434 |
| 2014/0029483 A1 | 1/2014 | Challa et al. | |
| 2015/0071103 A1* | 3/2015 | Xu | H04W 48/16 370/252 |

* cited by examiner

*Primary Examiner* — Chuck Huynh
(74) *Attorney, Agent, or Firm* — Harness, Dickey & Pierce, P.L.C.

(57) ABSTRACT

An operating method of a terminal configured to communicate with at least one of a plurality of cells includes generating first cell search training data for the plurality of cells, determining at least one training candidate cell based on the first cell search training data, updating a classification based on second cell search training data among the first cell search training data and network information about the terminal to obtain an updated classification, the second cell search training data corresponding to the at least one training candidate cell, and determining a valid cell among the plurality of cells based on the updated classification.

15 Claims, 13 Drawing Sheets

|  | Index_11 | Index_12 | ⋯ | Index_1t | — MA1 |
|---|---|---|---|---|---|
| R1 | C_11a | C_12a | ⋯ | C_1ta | |
| R2 | C_21a | C_22a | ⋯ | C_2ta | VCDS |
| ⋮ | ⋮ | ⋮ | ⋯ | ⋮ | |
| Rz | C_z1a | C_z2a | ⋯ | C_zta | |

|  | Index_21 | Index_22 | ⋯ | Index_2t | — MA2 |
|---|---|---|---|---|---|
| R1 | C_11b | C_12b | ⋯ | C_1tb | |
| R2 | C_21b | C_22b | ⋯ | C_2tb | FCDS |
| ⋮ | ⋮ | ⋮ | ⋯ | ⋮ | |
| Rz | C_z1b | C_z2b | ⋯ | C_ztb | |

OPERATING METHOD OF TERMINAL AND TERMINAL

CROSS-REFERENCE TO RELATED APPLICATION

This application claims the benefit of Korean Patent Application No. 10-2020-0035817, filed on Mar. 24, 2020 in the Korean Intellectual Property Office, the disclosure of which is incorporated herein in its entirety by reference.

BACKGROUND

An example embodiment relates to an operating method of a terminal for improving cell detection performance and the terminal.

For network communication with an optimal or desired cell (or a base station), a terminal may perform a cell search operation for a plurality of cells. The terminal calculates a correlation between a received signal and a reference signal by using a synchronization signal received from each of the plurality of cells, and determines a valid cell from the plurality of cells based on the correlation. However, when a method of the above-described valid cell determination is applied to the terminal, the accuracy in an index such as a correlation is reduced in a noise environment in which a signal electric field is weak. In other words, as a correlation reference value for the valid cell determination is set high, the probability of falsely determining a valid cell as a false cell is reduced, but the probability of losing candidate cells that are determined as valid cells is increased. On the other hand, as the correlation reference value for the valid cell determination is set low, the probability of falsely determining a valid cell as a false cell is reduced, but the probability of determining the false cell as a valid cell is increased. A reference design of the valid cell determination that maintains an improved valid cell determination performance constant without being affected by the communication environment of the terminal would be desirable.

SUMMARY

An example embodiment provides a terminal capable of maintaining improved cell search performance constant in various communication environments thereof by designing a determination reference for a valid cell based on machine learning, and an operating method of the terminal.

According to an example embodiment, there is provided an operating method of a terminal configured to communicate with at least one of a plurality of cells including: generating first cell search training data for the plurality of cells, determining at least one training candidate cell based on the first cell search training data, updating a classification based on second cell search training data among the first cell search training data and network information about the terminal to obtain an updated classification, the second cell search training data corresponding to the at least one training candidate cell, and determining a valid cell among the plurality of cells based on the updated classification.

According to an example embodiment, there is provided an operating method of a terminal configured to communicate with at least one of a plurality of cells including: generating first cell search training data for the plurality of cells, determining a plurality of training candidate cells based on the first cell search training data, classifying second cell search training data among the first cell search training data into a valid cell data set and a false cell data set based on network information about the terminal, the second cell search training data corresponding to the plurality of training candidate cells, and updating a classification based on a linear separation between the valid cell data set and the false cell data set to obtain an updated classification.

According to an example embodiment, there is provided a terminal configured to communicate with at least one of a plurality of cells including: a plurality of antennas configured to receive high frequency signals of each of the plurality of cells, a radio frequency integrated circuit configured to process the high frequency signals into baseband signals, and processing circuitry configured to detect a plurality of synchronization signals of the plurality of cells from the baseband signals, generate first cell search training data using the plurality of synchronization signals, determine a training valid cell candidate group from among the plurality of cells based on the first cell search training data, and update a classification based on second cell search training data among the first cell search training data and network information about the terminal, the second cell search training data corresponding to the training valid cell candidate group.

BRIEF DESCRIPTION OF THE DRAWINGS

An example embodiment will be more clearly understood from the following detailed description taken in conjunction with the accompanying drawings in which.

DETAILED DESCRIPTION

A base station may communicate with a terminal, and allocate communication network resources to the terminal.

The base station may include at least one of a cell, a base station (BS), a NodeB (NB), an eNodB (eNB), a Next Generation Radio Access Network (NG RAN), a wireless connection unit, a BS controller, and/or a node on a network. Hereinafter, for convenience of description, a BS may be referred to as the cell.

The terminal (or a communication terminal) may communicate with a cell or another terminal. The terminal may be referred to as a node, user equipment (UE), next generation UE (NG UE), a mobile station (MS), mobile equipment (ME), a device, or a terminal.

In addition, the terminal may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a medical device, a camera, and a wearable device. In addition, the terminal may include at least one of a TV set, a Digital Video Disk (DVD) player, an audio device, a refrigerator, an air conditioner, a vacuum cleaner, an oven, a microwave, a washing machine, an air cleaner, a set-top box, a home automation control panel, a security control panel, a media box (for example, Samsung HomeSync™, Apple TV™, or Google TV™), a game console (for example, Xbox™ or PlayStation™), an electronic dictionary, an electronic key, a camcorder, and an electronic picture frame. In addition, the terminal may include at least one of various medical devices (for example, various portable medical measurement devices (a blood glucose meter, a heart rate meter, a blood pressure meter, a body temperature meter, or the like)), Magnetic Resonance Angiography (MRA), Magnetic Resonance Imaging (MRI), Computed Tomography (CT), a camera, or an ultrasonic device, a navigation device, a Global Navigation Satellite System (GNSS), an Event Data Recorder (EDR), a Flight Data Recorder (FDR), an automotive infotainment device, electronic equipment for ships (for example, a marine navigation device, a gyro compass, or the like), avionics, a security device, a head unit for vehicles, an industrial or household robot, a drone, an Automated Teller Machine (ATM) (e.g., in financial institutions), Point of Sales (POS) (e.g., in stores), and/or Internet of Things (IoT) devices (for example, a light bulb, various sensors, a sprinkler device, a fire alarm, a thermostat, a street light, a toaster, exercise equipment, a hot water tank, a heater, a boiler, and the like). In addition, the terminal may include various types of multimedia systems capable of communication functions.

Hereinafter, an example embodiment is described in detail with reference to the accompanying drawings.

Figure 1:
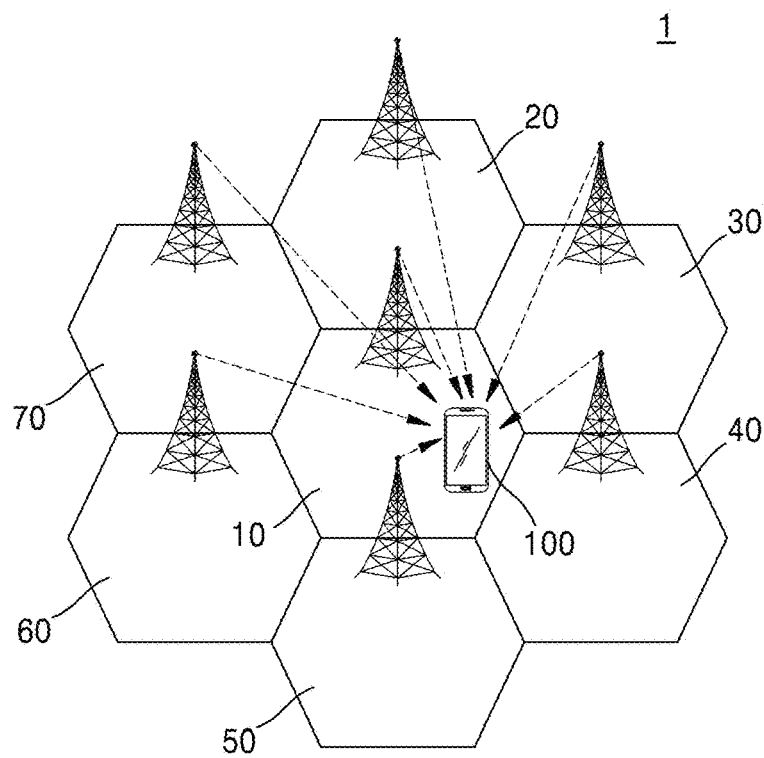
FIG. 1 is a diagram illustrating a wireless communication system according to an example embodiment.

FIG. 1 is a diagram of a wireless communication system 1 according to an example embodiment.

Referring to FIG. 1, the wireless communication system 1 may include first through seventh cells 10 through 70 (e.g., a first cell 10, a second cell 20, a third cell 30, a fourth cell 40, a fifth cell 50, a sixth cell 60 and/or a seventh cell 70) and/or a terminal 100.

The terminal 100 may access the wireless communication system 1 by transceiving signals to and from the first through seventh cells 10 through 70. The wireless communication system 1 to which the terminal 100 is capable of being connected may be referred to as Radio Access Technology (RAT), and may include, as a non-limiting example, a wireless communication system using a cellular network such as a fifth-Generation (5G) communication system, a Long Term Evolution (LTE) communication system, an LTE-Advanced (A) (LTE-A) communication system, a Code Division Multiple Access (CDMA) communication system, and a Global System for Mobile communications (GSM) communication system, and/or a Wireless Local Area Network (WLAN) communication system, or other arbitrary wireless communication systems.

A wireless communication network of the wireless communication system 1 may support communication of a plurality of wireless communication devices including the terminal 100 by sharing available network resources. For example, in the wireless communication network, information may be transmitted in various multiple connection methods such as CDMA, Frequency Division Multiple Access (FDMA), Time Division Multiple Access (TDMA), Orthogonal Frequency Division Multiple Access (OFDMA), Single Carrier Frequency Division Multiple Access (SC-FDMA), Orthogonal Frequency Division Multiplexing (OFDM)-FDMA, OFDM-TDMA, and OFDM-CDMA.

The first through seventh cells 10 through 70 may generally be referred to as fixed stations in communication with the terminal 100 and/or other cells, and may exchange data and control information by communicating with the terminal 100 and the other cells. For example, each of the first through seventh cells 10 through 70 may be referred to as a base station, a Node B, an evolved-Node B (eNB), a next generation node B (gNB), a sector, a site, a Base Transceiver System (BTS), an Access Point (AP), a relay node, a Remote Radio Head (RRH), a Radio Unit (RU), a small cell, etc. In the present specification, a cell may be interpreted in a generic sense to denote some area or function covered by a Base Station Controller (BSC) in CDMA, a Node-B in Wideband CDMA (WCDMA), an eNB in LTE, a sector, or the like, and may cover all various coverage areas such as a megacell, a macrocell, a microcell, a picocell, a femtocell, a relay node, an RRH, an RU, and/or a small cell communication range.

The first through seventh cells 10 through 70 may be connected to the terminal 100 via a wireless channel and provide various communication services. The first through seventh cells 10 through 70 may serve all user traffic via a shared channel, and may perform scheduling by collecting status information such as a buffer status, an available transmission power status, and/or a channel status of the terminal 100. The wireless communication system 1 may support beamforming technology by using Orthogonal Frequency Division Multiplexing (OFDM) as the radio access technology. In addition, the wireless communication system 1 may support an Adaptive Modulation and Coding (AMC) method for determining a modulation scheme and/or a channel coding rate according to the channel state of the terminal 100.

The first through seventh cells 10 through 70 may be neighboring cells surrounding the terminal 100 and/or adjacent to the terminal 100, and may vary according to a location of the terminal 100. The terminal 100 may perform a cell search operation to be connected to and communicate with any one of the first through seventh cells 10 through 70. The cell search operation may include cell identification and cell measurement. For example, the terminal 100 may detect and record the first through seventh cells 10 through 70 (e.g., the cell identification (ID) of each of the first through seventh cells 10 through 70) while performing the cell identification, and may measure signal power and the like corresponding to each of the first through seventh cells 10 through 70, which have been identified while performing the cell measurement.

Hereinafter, the cell search operation of the terminal 100 is described in detail. The terminal 100 may generate cell search data by using signals received from the first through seventh cells 10 through 70. For example, the terminal 100 may receive a synchronization signal from each of the first through seventh cells 10 through 70 and generate the cell search data based on a detection result of the synchronization signal. The terminal 100 may determine a valid cell candidate group from the first through seventh cells 10 through 70 based on the cell search data and a classifier. The classifier may classify cells, which are likely to be determined as valid cells among the first through seventh cells 10 through 70, as candidate cells. For example, the classifier may set a classification function corresponding thereto, compare, with a reference value, outputs generated by applying the cell search data to the classification function, and determine the valid cell candidate group based on the comparison result. For example, when the output of the classification function generated by inputting the cell search data corresponding to the first cell meets a first reference, the terminal 100 may classify the first cell as the candidate cell, and when the output meets a second reference, may classify the first cell as a false cell. The cell search data may include a correlation between a received signal from the first through seventh cells 10 through 70 and a reference signal, a magnitude of the correlation, and a phase obtained from the correlation, and the classifier may compare each of the outputs generated by applying the cell search data including the correlation-related data described above with the reference value, and may determine the valid cell candidate group based on the comparison result.

However, as described above, because the accuracy in an index such as the correlation varies in a noise environment in which a signal electric field is weak or strong, a design of a non-fixed classifier (or, classification functions and classification references) may be desirable, to accurately determine the valid cell even in various noise environments.

The terminal 100 according to an example embodiment may maintain constant the improved cell search performance even in a varying noise environment by continuously updating the classifier. As an example embodiment, the terminal 100 may generate first cell search training data for the first through seventh cells 10 through 70. The first cell search training data may update the classifier, and the terminal 100 may periodically generate the first cell search training data separately from the cell search operation. Further, the terminal 100 may generate the first cell search training data to update the classifier in parallel (e.g., simultaneously or contemporaneously) with the cell search operation, and furthermore, the terminal 100 may update the classifier by using the cell search data generated in the cell search operation. On the other hand, in an example embodiment, the first through seventh cells 10 through 70 may include cells that do not actually exist, or fake cells, and the terminal 100 may generate the first cell search training data for the cells that do not actually exist or the fake cells.

As an example embodiment, the terminal 100 may determine a training valid cell candidate group including at least one training candidate cell based on the first cell search training data. The training candidate cell may be defined as a cell used to update the classifier. The terminal 100 may compare the magnitude of the correlation between the received signal of each cell included in the first cell search training data, and the reference signal with a correlation reference value, and determine the training valid cell candidate group based on the comparison result. For example, the first cell search training data may include a correlation between the received signal from the first through seventh cells 10 through 70 and the reference signal, the magnitude of the correlation, and/or the phase obtained from the correlation. Furthermore, the first cell search training data may further include at least one of cell identification number (ID), signal timing, and/or received power of each of the first through seventh cells 10 through 70. According to an example embodiment, the correlation between the received signal from the first through seventh cells 10 through 70 and the reference signal may be a vector component, and the magnitude of the correlation may be a scalar component. According to an example embodiment, the signal timing refers to timing information regarding received signals from the first through seventh cells 10 through 70, and the received power refers to the power of received signals from the first through seventh cells 10 through 70.

The terminal 100 may update the classifier (e.g., update a classification function and/or a classification) by selectively using second cell search training data (may also referred to herein as the second training cell search data, according to an example embodiment) corresponding to the training valid cell candidate group among the first cell search training data. As an example embodiment, the terminal 100 may update the classifier based on the second cell search training data and network information about the terminal 100. The network information about the terminal 100 may include at least one of information about a cell currently connected to the terminal 100 and information about a current network connection state (may also be referred to herein as a current network state, according to an example embodiment) of the terminal 100. Details of the updating operation of the classifier of the terminal 100 by using the second cell search training data and the network information are described later. For example, the terminal 100 may perform the updating operation on the classifier based on various machine learning techniques.

For initialization before performing the cell search operation, the terminal may use the initial first cell search training data that is generated when a valid signal is applied and the initial first cell search training data that is generated when a false signal is applied, in a previously intended noise environment. The terminal may initially set the classifier by performing an initial learning using the initial first cell search training data. According to an example embodiment, the initial first cell search training data may be stored in a memory of the terminal for use in initializing the classifier.

The terminal 100 according to an example embodiment may stably provide an improved cell search performance in various noise environments, by continuously updating the classifier used for determining the valid cell from the first through seventh cells 10 through 70, which may be adjacent to each other. Furthermore, the terminal 100 may also reduce excessive resource consumption by reducing a frequency of a connection operation to an invalid cell.

Figure 2:
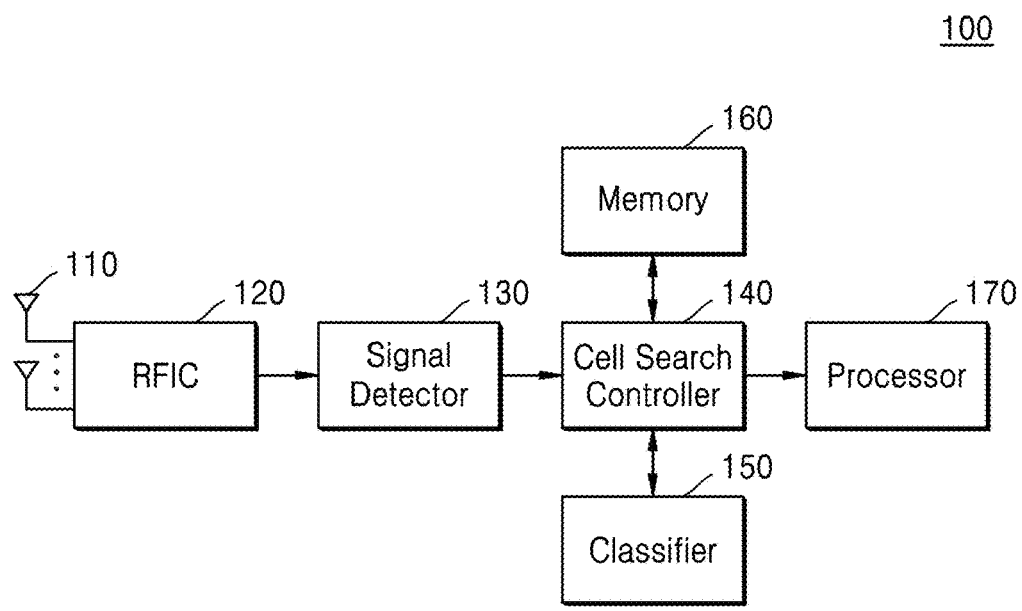
FIG. 2 illustrates a block diagram illustrating a terminal according to an example embodiment.

FIG. 2 is a block diagram illustrating a terminal 100 according to an example embodiment.

Referring to FIG. 2, the terminal 100 may include a plurality of antennas 110, a Radio Frequency Integrated Circuit (RFIC) 120, a signal detector 130, a cell search controller 140, a classifier 150, a memory 160, and/or a processor 170. In an example embodiment, the plurality of antennas 110 and the RFIC 120 may be configured as a front-end module, and the signal detector 130, the cell search controller 140, the classifier 150, the memory 160, and the processor 170 may be configured as a back-end module. Further, in FIG. 2, the signal detector 130, the cell search controller 140, the classifier 150, and the processor 170 are illustrated in a configuration divided into roles, but are not limited thereto, and the signal detector 130, the cell search controller 140, the classifier 150, and/or the processor 170 may be implemented with one baseband processor.

The antennas 110 may transmit a signal processed by the RFIC 120 via a wireless channel and/or receive a signal transmitted from a cell via the wireless channel. The RFIC 120 may amplify a signal received from the antennas 110 with low noise, and perform frequency down-conversion on the amplified signal to a baseband signal.

The signal detector 130 may detect synchronization signals received from cells adjacent to the terminal 100. For example, the synchronization signal may include a primary synchronization signal (PSS) and a secondary synchronization signal (SSS), and the signal detector 130 may sequentially detect the PSS and the SSS, and generate the first cell search training data for adjacent cells. The signal detector 130 may detect the PSS of an arbitrary adjacent cell, obtain certain timing information (for example, 5 milliseconds) of the cell from the detected PSS, and obtain a location of the SSS and the cell ID in the cell ID group of the cell. Next, the signal detector 130 may detect the SSS, obtain a frame timing of the cell from the detected SSS, and obtain the cell group ID to which the cell belongs and the reference signal corresponding to the cell. The signal detector 130 may output the first cell search training data including the correlation that is generated by calculating a correlation between the signal received from the cell and the reference signal, the magnitude of the correlation, and/or the phase obtained from the correlation to the cell search controller 140.

The cell search controller 140 may determine a training valid cell candidate group including at least one training candidate cell by using the first cell search training data. For example, the cell search controller 140 may determine the training valid cell candidate group based on the magnitude of the correlation between the received signal for each cell included in the first cell search training data and the reference signal.

The cell search controller 140 may extract the second cell search training data corresponding to the training valid cell candidate group from the first cell search training data. The cell search controller 140 may classify the second cell search training data into a valid cell data set and a false cell data set based on the network information of the terminal 100. As an example embodiment, the network information of the terminal 100 may include information about a cell to which the terminal 100 is currently connected, for example, the cell ID currently connected, and the cell search controller 140 may classify the second training cell search data corresponding to the training candidate cell having the ID matched with the currently connected cell ID into the valid cell data set, and the second training cell search data corresponding to the training candidate cell having an ID that is inconsistent with the currently connected cell ID into the false cell data set. Hereinafter, the false cell may be defined as a weak cell that is not suitable for connection to the terminal 100. Furthermore, the false cell may include a non-existing cell, and may be referred to as a ghost cell.

In an example embodiment, the cell search controller 140 may update the classifier 150 based on linear separation between the valid cell data set and the false cell data set. When the valid cell data set and the false cell data set are applied to the classification function corresponding to the classifier 150 (e.g., the classification), the output results may have linear separation, and details thereof is described later.

Because the valid cell data set is classified based on information on the currently connected cell, when the valid cell data set is input to the classifier 150 (e.g., applied to the classification and/or input to the classification function), the input result output by the classifier 150 may be expected to meet the first reference. The first reference may be a preset or alternatively, given reference to classify at least one cell among a plurality of cells into the candidate cell or the valid cell, when searching for a cell. The cell search controller 140 may appropriately update the classifier 150 when the input result of the classifier 150 corresponding to the valid cell data set does not meet the first reference. In addition, because the false cell data set is classified based on information about the currently connected cell, when the false cell data set is input to the classifier 150 (e.g., applied to the classification and/or input to the classification function), the input result output by the classifier 150 may be expected to meet the second reference. The second reference may be a preset or alternatively, given reference for removing the false cell from the plurality of cells while searching for a cell. The cell search controller 140 may appropriately update the classifier 150 when the input result of the classifier 150 corresponding to the false cell data set does not meet the second reference. According to an example embodiment, the first reference and/or the second reference may be a design parameter determined through empirical study.

In an example embodiment, the update operation of the cell search controller 140 to the classifier 150 may include an operation of adjusting at least one parameter of the classification function (e.g., adjusting a classification and/or a classification criteria) corresponding to the classifier 150. As an example, the classification function may include at least one of slope and/or bias, and may correspond to a linear function. As a non-limiting example, the classification function may be a support vector machine (SVM) classification function. Moreover, the cell search controller 140 may include a machine learning engine for continuously updating the classifier 150 in the above manner.

In an example embodiment, the cell search controller 140 may selectively store the valid cell data set and the false cell data set in the memory 160 considering the storage capacity of the memory 160 before inputting the valid cell data set and the false cell data set to the classifier 150. The memory 160 may include a first memory area and a second memory area, the valid cell data set may be stored in the first memory area, and the false cell data set may be stored in the second memory area. On the other hand, because the first memory area and the second memory area have a limited storage capacity, and both the valid cell data set and the false cell data set that are periodically and newly generated may not be stored, the cell search controller 140 may belong to a certain valid range among the valid cell data set and the false cell data set, select data adjacent to the classification reference of the classifier 150, and store the selected data in each of the first memory area and the second memory area. Details of this are described later. The cell search controller 140 may perform the cell search operation by using the updated classifier 150 and determine the valid cell among the plurality of cells.

As an example embodiment, the classifier 150 may determine the valid cell candidate group based on the input result when cell search data is input from the cell search controller 140 while searching for a cell. In an example embodiment, the classifier 150 may remove the false cell included in the valid cell candidate group based on the input result when the cell search data corresponding to the valid cell candidate group determined from the cell search controller 140 is input. In an example embodiment, the classifier 150 may immediately or promptly determine the valid cell based on the input result when the cell search data is input from the cell search controller 140. Hereinafter, descriptions are given mainly based on an example embodiment in which the accurate valid cell candidate group is determined by using the classifier 150, but are not limited thereto. In an example embodiment, the false cell included in the valid cell candidate group determined by using the classifier 150 may be removed, or an operation of determining the valid cell may be performed by using the cell search data. The processor 170 may control various operations for wireless communication with the valid cell determined by the cell search controller 140.

Figure 3:
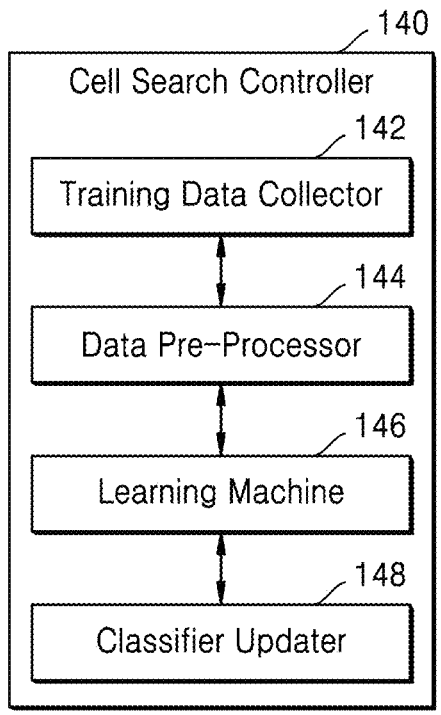
FIG. 3 is a block diagram illustrating a cell search controller according to an example embodiment.

FIG. 3 is a block diagram illustrating the cell search controller 140 according to an example embodiment. In FIG. 3, a configuration is divided according to particular roles of the cell search controller 140, but this is for convenience of description and an example embodiment is not limited thereto, and it should be clearly understood that the cell search controller 140 may be implemented in various ways such as hardware or a combination of software and hardware.

Referring to FIG. 3, the cell search controller 140 may include a training data collector 142, a data pre-processor 144, a learning machine 146, and/or a classifier updater 148. The training data collector 142 may collect the first cell search training data by using signals received from the plurality of cells. In an example embodiment, the first cell search training data may include the correlation between the received signal and the reference signal of each of the plurality of cells, the magnitude of the correlation, and/or the phase obtained from the correlation, and may further include at least one of the cell ID, the signal timing, and/or the received power. On the other hand, the magnitude of the correlation for each of the plurality of cells of the first cell search training data and/or the phase obtained from the correlation may correspond to variables applied to the classification function corresponding to a classifier to be described later. Details of this are described later.

The training data collector 142 may determine the training valid cell candidate group from the first cell search training data, and by using the information about the cell currently connected to the terminal, may classify the second cell search training data into the valid cell data set and the false cell data set. The training data collector 142 may perform the operation of classifying the false cell data set only when the network electric field between the terminal and the currently connected cell is equal to or greater than a reference electric field. In other words, when the network electric field is less than a reference electric field, the valid cell may be mistaken for the false cell, and thus the reliability of the false cell data set may deteriorate, and the training data collector 142 may perform the classification operation of the false cell data set based on the above-described condition. The operation of classifying the valid cell data set may be performed regardless of a state of the network electric field. According to an example embodiment, the reference electric field may be a design parameter determined through empirical study. According to an example embodiment, a desirable network electric field is a noise environment where the signal electric field is strong, and an undesirable network electric field is a noise in environment where the signal electric field is weak.

The data pre-processor 144 may perform a pre-processing operation on the valid cell data set and the false cell data set (e.g., the second cell search training data) based on the current network state of the terminal before updating the classifier by using the valid cell data set and the false cell data set. For example, the current network state of the terminal may include at least one of a network connection start state of the terminal (e.g., a network connection state of the terminal) and/or a handover state of the terminal. The network connection start state of the terminal may mean a network state for starting connection with a cell for the first time when the terminal is turned on. The handover state of the terminal may refer to a network state for switching a connection from one cell to another due to a movement of the terminal or the like. The data pre-processor 144 may reflect the current network state of the terminal to the classifier (e.g., may update the classifier based on the current network state of the terminal) by performing pre-processing on the valid cell data set and the false cell data set. For example, the data pre-processor 144 may perform the pre-processing operation by applying a certain rotation matrix to the valid cell data set and the false cell data set. Details of this are described later. On the other hand, in an example embodiment, the operation of the pre-processor 144 may be omitted. According to an example embodiment, the terms data pre-processor and pre-processing operation as used herein may have meaning that does not reflect a timing or order of the pre-processing operation, and/or operations of the data pre-processor, with regards to other operations of the terminal 100.

The learning machine 146 may input the valid cell data sets and the false cell data sets to the classifier, and perform mechanical learning (e.g., machine learning) on the classification function corresponding to the classifier based on the input result output from the classifier. The learning machine 146 may learn the linear separation of the valid cell data set and the false cell data set based on the classification function of the classifier, and may derive an optimal or desired classification function capable of differentiating the valid cell data set from the false cell data set. According to an example embodiment, the learning machine 146 may determine the linear separation by inputting the valid cell data set in the classifier and comparing the output (e.g., a first output) to a first reference, and inputting the false cell data set in the classifier and comparing the output (e.g., a second output) to a second reference. According to an example embodiment, if the first output is equal to the first reference and the second output is equal to the second reference, the linear separation of the classifier is determined to be appropriate. According to an example embodiment, if the first output is different from the first reference and/or the second output is different from the second reference, the linear separation of the classifier is determined to be inappropriate, and the classifier is updated. In an example embodiment, processing circuitry of the terminal 100 may perform some operations (e.g., the operations described herein as being performed by the learning machine 146) by artificial intelligence and/or machine learning. As an example, the processing circuitry may implement an artificial neural network that is trained on a set of training data (e.g., the valid cell data sets and/or the false cell data sets) by, for example, a supervised, unsupervised, and/or reinforcement learning model, and wherein the processing circuitry may process a feature vector to provide output based upon the training. Such artificial neural networks may utilize a variety of artificial neural network organizational and processing models, such as convolutional neural networks (CNN), recurrent neural networks (RNN) optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The classifier updater 148 may adjust at least one parameter of the classification function of the classifier based on the learning results of the learning machine 146. The classification function may be implemented as a linear function, and parameters of the classification function may include a slope and/or a bias of the classification function.

Figure 4:
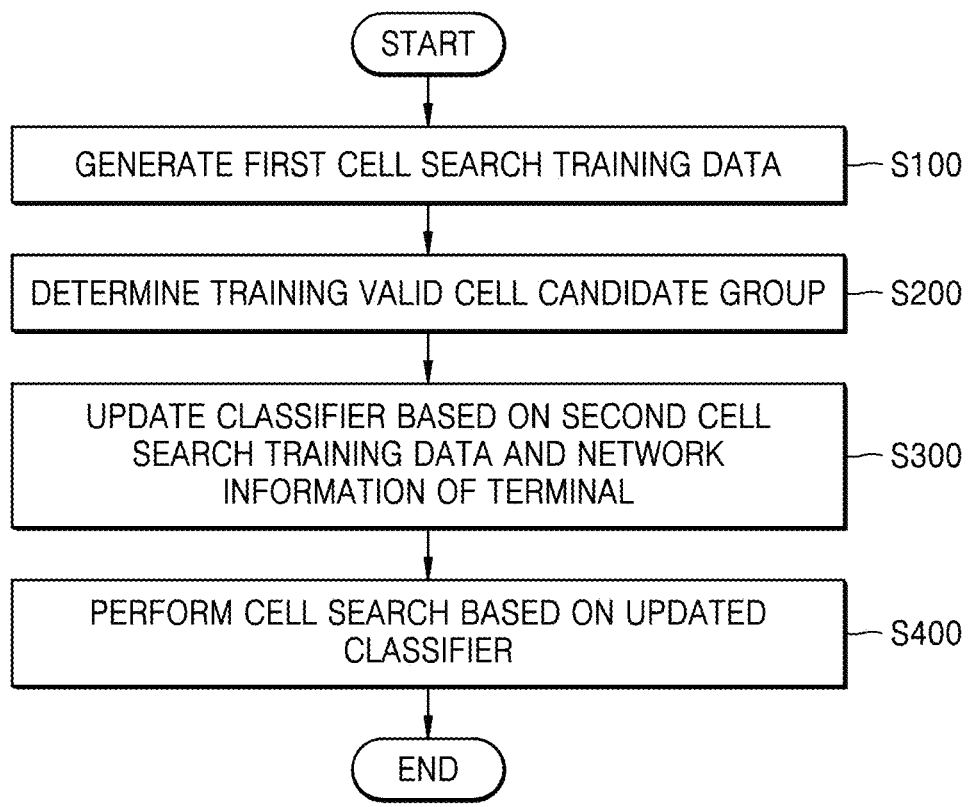
FIG. 4 is a flowchart of a cell search method of a terminal, according to an example embodiment.

FIG. 4 is a flowchart of a cell search method of the terminal, according to an example embodiment.

Referring to FIG. 4, the terminal 100 may generate the first cell search training data for the plurality of cells (S100). For example, the terminal may detect synchronization signals received from the plurality of cells, and generate the first cell search training data including unique information including the cell ID, and a correlation between a received signal and a reference signal for each cell. The terminal may determine the training valid cell candidate group including at least one training candidate cell by using the first cell search training data (S200). For example, the terminal may compare the magnitude of the correlation between the received signal for each cell of the first cell search training data and the reference signal with the correlation reference value, and after checking the comparison result for each cell, determine the training candidate cell from the plurality of cells. The terminal may update the classifier based on the second cell search training data corresponding to the training valid cell candidate group and the network information of the terminal (S300). For example, the terminal may classify the second cell search training data into the valid cell data set and the false cell data set based on information about cells connected thereto in the network information. In addition, the terminal may reflect information about the current network connection state thereof among the network information into the classifier. Because the appropriate classification function varies according to the current network connection state of the terminal, by performing a pre-processing operation the valid cell data set and the false cell data set that are to be entered into the classifier according to the current network connection state, the terminal may indirectly adjust so that at least one parameter of the classification function of the classifier meets the current network connection state of the terminal. The terminal may input the valid cell data set and the false cell data set to the classifier, and update the classifier based on the input result output from the classifier. For example, when the valid cell data set is applied to the classification function of the classifier, and a result that does not meet the first reference is output, or when the false cell data set is applied to the classification function of the classifier, and a result that does not meet the second reference is output, the terminal may update the classifier by adjusting at least one parameter of the classification function. The terminal may perform the cell search operation based on the updated classifier (S400). For example, the terminal may generate cell search data for the plurality of cells during the cell search, and by applying the cell search data to the updated classifier, may determine the valid cell candidate group. The terminal may determine a candidate cell having the largest received power among the measured received pieces of power of each of the candidate cells in the valid cell candidate group as a valid cell. For example, the received power may correspond to at least one of Reference Signal Received Power (RSRP) associated with a cell-specific reference signal, Synchronization Received Power (SCH_RP) associated with a synchronization signal, Reference Signal Received Quality (RSRQ), Signal-to-Interference-and-Noise Ratio (SINR), Received Signal Strength Indicator (RSSI), and the like.

In an example embodiment of operation S400, the terminal may generate the cell search data for the plurality of cells during the cell search operation, and determine the valid cell candidate group based on the cell search data. The terminal may remove the false cells included in the valid cell candidate group by applying the cell search data corresponding to the valid cell candidate group to the updated classifier. In an example embodiment of operation S400, when the cell search data corresponding to the valid cell candidate group determined based on the cell search data is applied to the updated classifier, the terminal may immediately or promptly determine the valid cell based on the input result of the classifier. According to an example embodiment, following operation S400, the terminal 100 may connect with a valid cell included in the valid cell candidate group and perform communication with the valid cell (e.g., transmit and/or receive data).

Figure 5:
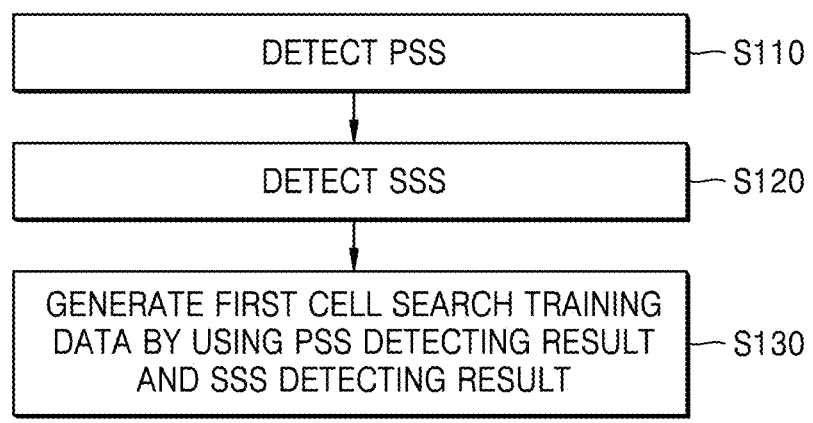
FIG. 5 is a flowchart illustrating in detail operation S100 in FIG. 4, according to an example embodiment.

FIG. 5 is a detailed flowchart of operation S100 in FIG. 4, according to an example embodiment.

Referring to FIG. 5, the terminal may receive synchronization signals from the plurality of cells, and detect the PSS in the synchronization signals for each cell (S110). The terminal may detect the SSS for each cell by using the PSS detection result for each cell (S120). The terminal may generate the first cell search training data by using the PSS detection result and the SSS detection result for each cell (S130). For example, the first cell search training data may have a data format suitable for application to the classifier, and the first cell search training data may include unique information for the plurality of cells.

Figure 6:
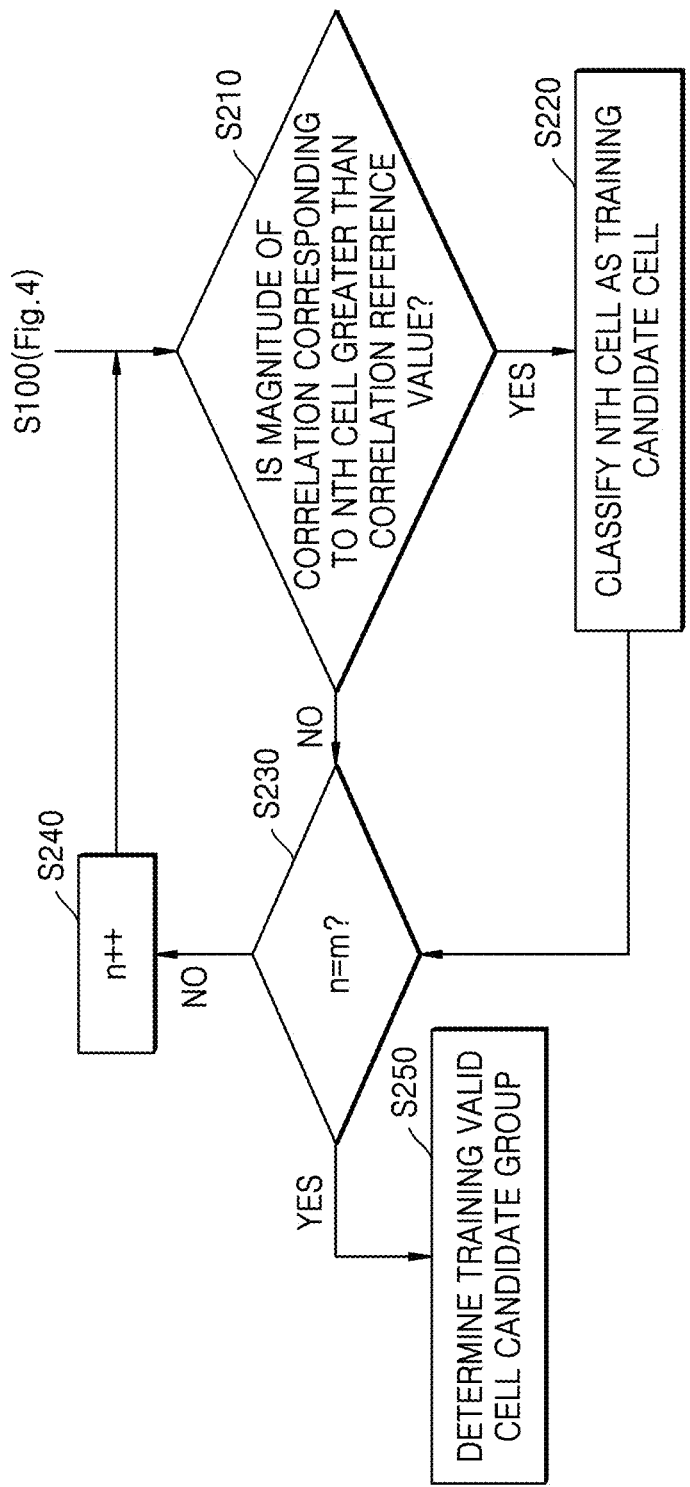
FIG. 6 is a flowchart illustrating in detail operation S200 in FIG. 4, according to an example embodiment.

FIG. 6 is a detailed flowchart of operation S200 in FIG. 4, according to an example embodiment.

Referring to FIG. 6, after operation S100 in FIG. 4, whether the magnitude of correlation between a received signal corresponding to an $n^{th}$ (where n is an integer of 1 or more) cell among the plurality of cells is greater than the reference value may determined (S210). According to an example embodiment, 'n' is initialized to have a value of '1' prior to performing the operations depicted in FIG. 6). When a result of operation S210 is 'Yes', the terminal may classify the $n^{th}$ cell as the training candidate cell (S220) and proceed to operation S230. Otherwise, when the result of operation S210 is 'No', whether 'n' is equal to 'm', corresponding to a total number of cells adjacent to the terminal, may be determined (S230). When a result of operation S230 is 'No', the terminal may count up (e.g., increment) 'n' and perform (e.g., repeat) operation S210 (S240). Otherwise, when the result of operation S230 is 'Yes', the terminal may determine the training valid cell candidate group including at least one training candidate cell that has been previously classified (S250).

Figure 7A:
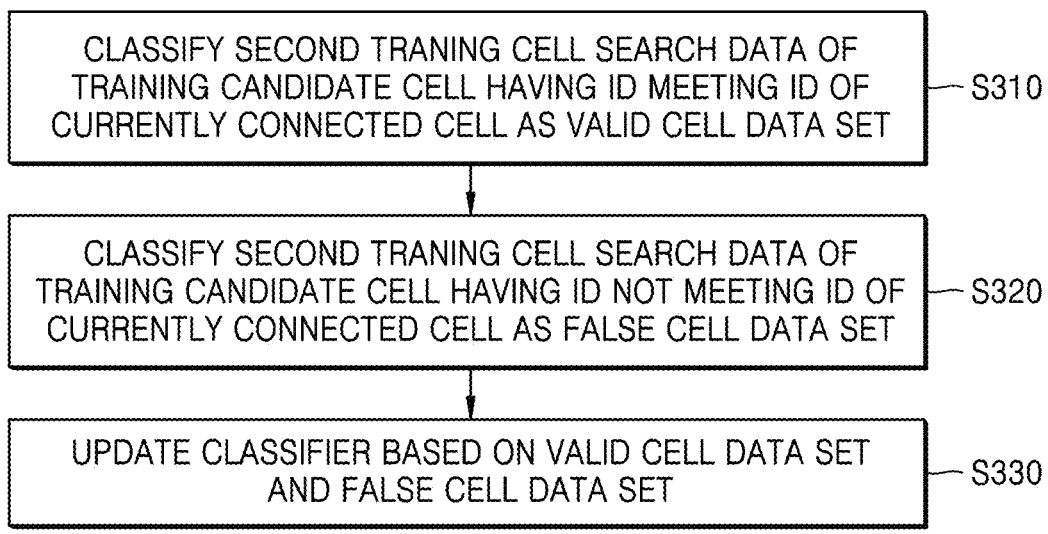
FIGS. 7A and 7B are flowcharts illustrating in detail operation S300 in FIG. 4, according to an example embodiment.
Figure 7B:
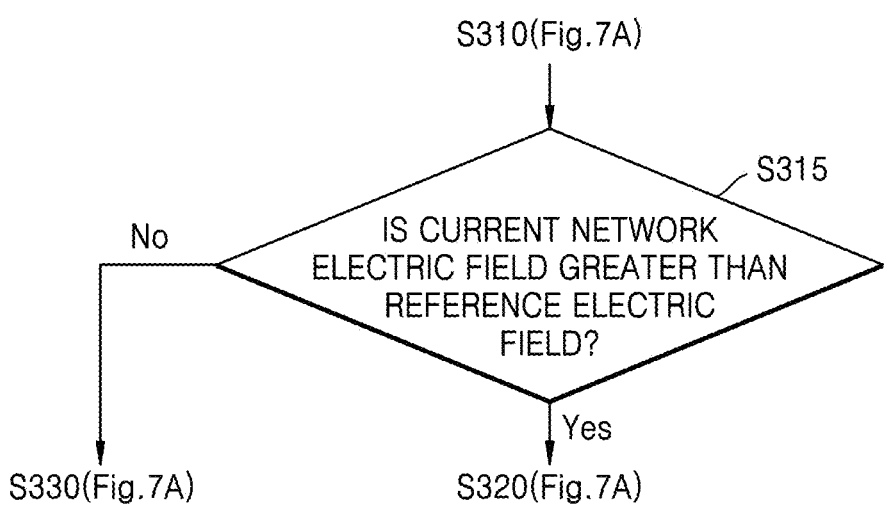

FIGS. 7A and 7B are detailed flowcharts of operation S300 in FIG. 4, according to an example embodiment.

Referring to FIG. 7A, the terminal may classify the second training cell search data (e.g., a first portion of the second training search data) of the training candidate cell having an ID that matches the ID of a cell connected to the current terminal as a valid cell data set (S310). The terminal may classify the second training cell search data (e.g., a second portion of the second training cell search data) of the training candidate cell having an ID that does not match an ID of a cell connected to the current terminal as the false cell data set (S320). The terminal may update the classifier based on the valid cell data set and the false cell data set (S330).

Referring to FIG. 7B, after operation S310 in FIG. 7A, the terminal may determine whether a current network electric field is greater than the reference electric field (S315). When a result of operation S315 is 'Yes', operation S320 in FIG. 7A may follow. Otherwise, when the result of operation S315 is 'No', operation S320 in FIG. 7A may be omitted and operation S330 may immediately or sequentially follow. In other words, when the result of operation S315 is 'No', the terminal may perform the update operation on the classifier by using only the valid cell data set except (e.g., without) the false cell data set.

Figure 8A:
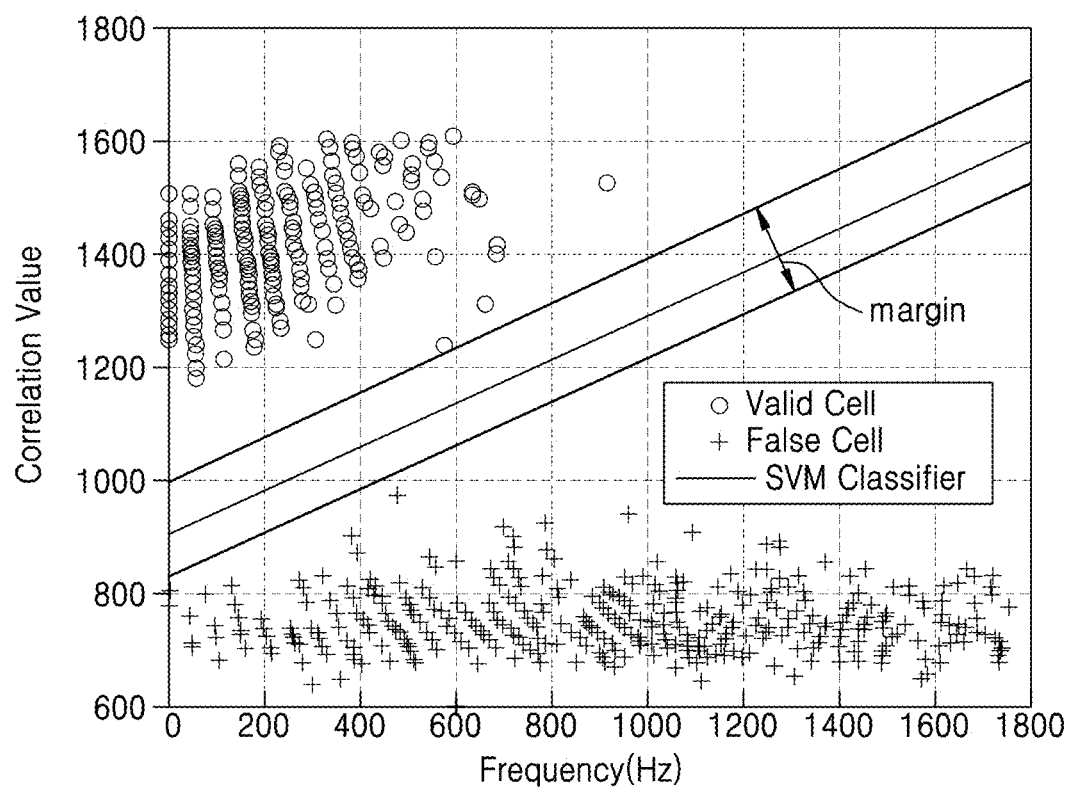
FIG. 8A is a graph for explaining a classifier based on SVM, according to an example embodiment.
Figure 8B:
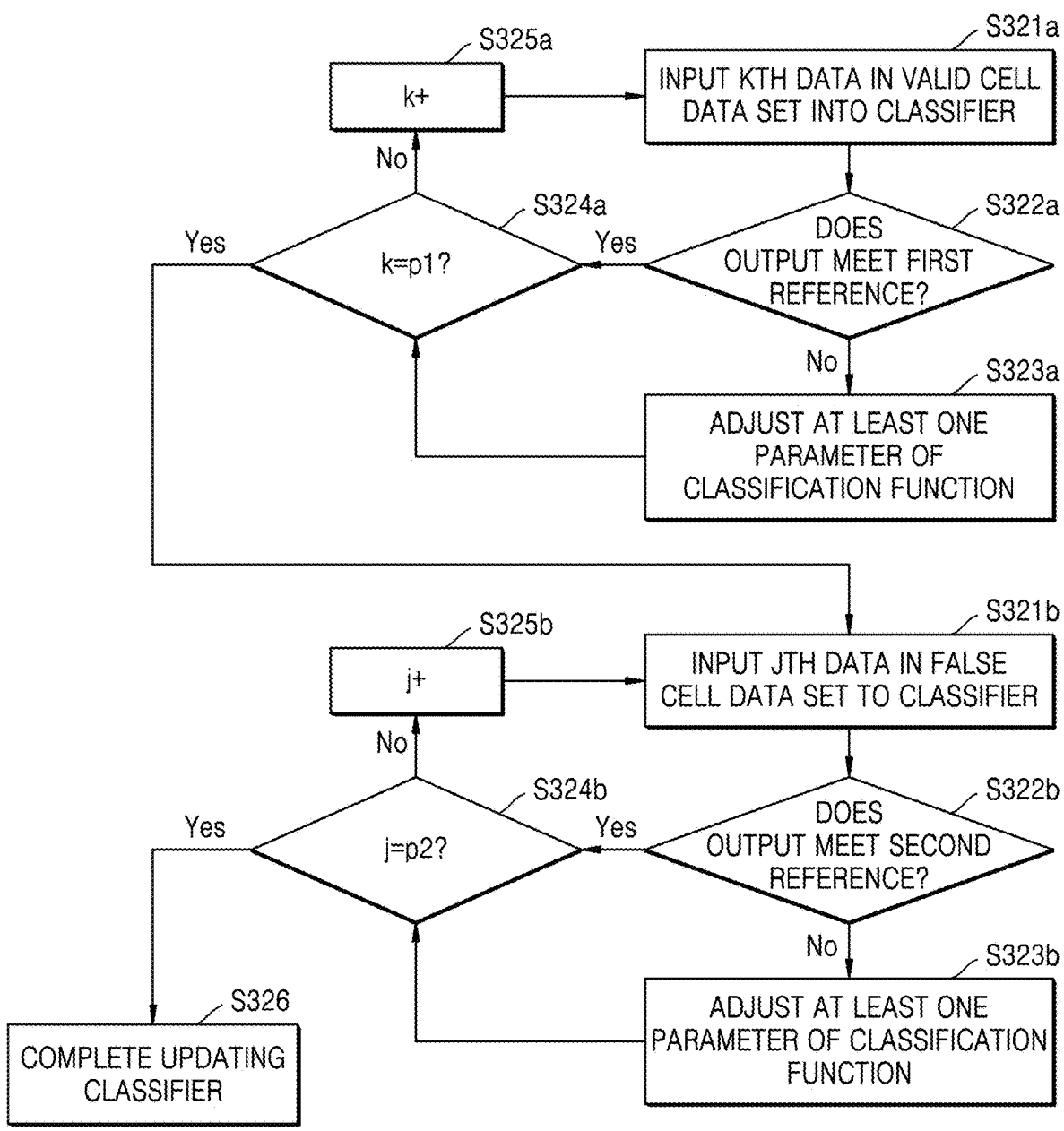
FIG. 8B is a flowchart of operation S300 in FIG. 4 in detail based on the description given with reference to FIG. 8A.

FIG. 8A is a graph for explaining a classifier based on the SVM, according to an example embodiment, and FIG. 8B is a detailed flowchart of operation S300 in FIG. 4 based on the description given with reference to FIG. 8A. Hereinafter, the classifier is described mainly based on an example embodiment implemented based on the SVM, but this is only an example embodiment, and an example embodiment is not limited thereto. It is clear that various classification techniques capable of separating the valid cells corresponding to the valid cell data set from the false cells corresponding to the false cell data set may be applied to the classifier. According to an example embodiment, the term classifier as used herein refers to processing circuitry configured to adjust (e.g., update) and/or manage a classification function (e.g., a classification and/or a classification criteria), and/or calculate a classification using the classification function. According to an example embodiment, references herein to inputting data into the classifier may refer to calculating a solution and/or classification using the input data as parameters in the classification function. According to an example embodiment, references herein to data output by the classifier may refer to a solution of the classification function and/or a classification calculated using the classification function.

The classifier according to an example embodiment may be based on the SVM. The SVM may be a machine learning engine that provides a classifier capable of classifying the training data set into any two groups. Assuming that there is a classifier capable of linear separation between the two groups, by providing a solution (e.g., for an optimization issue), a margin between the two groups (for example, between the valid cell data set and the false cell data set) may be increased. The classification function corresponding to the SVM-based classifier (or an SVM classifier) may be defined by Formula 1. According to an example embodiment, the classifier may determine and/or adjust parameters of the classification function (e.g., a slope and/or bias of the classification function) providing a greatest and/or a determined linear separation (e.g., margin) between the valid cell data set and the false cell data set (e.g., may update the classifier based on the linear separation).

$$f(x_i) = w^T x_i + b \qquad \text{[Formula 1]}$$

In Formula 1, w T may, as a slope of the classification function, be a symmetrical matrix parameter related with a margin, and $x_i$ may, as a parameter input to the classification function, correspond to any one of the first cell search training data, the valid cell data set, and/or the false cell data set. b may be a bias of the classification function. $x_i$ may be defined by Formula 2.

$$x_i = (\theta_i, \rho_i)^T \qquad \text{[Formula 2]}$$

$\rho_i$ may represent the magnitude of correlation between a received signal corresponding to the $i^{th}$ cell (wherein i is an integer of 1 or more), and $\theta_i$ may be phase determined by a real component and an imaginary component of the correlation corresponding to the $i^{th}$ cell. $x_i$ may be classified per cell and input to the classification function. The terminal may input the valid cell data set and the false cell data set to the classification function, and may adjust at least one of the slope and/or bias of the classification function by comparing the input result output from the classification function with a certain reference.

As illustrated in FIG. 8A, the valid cells corresponding to the valid cell data set and the false cells corresponding to the false cell data set may have linear separation from each other, and at least one of the slope and bias corresponding to the SVM-based classifier may be adjusted so that the valid cells and the false cells may be classified into optimal or desired margins.

In an example embodiment, the terminal may input the valid cell data set into the classification function, and determine whether a condition of Formula 3 is satisfied.

$$f(x_k) > TH \qquad \text{[Formula 3]}$$

When $x_k$, $k^{th}$ data corresponding to a $k^{th}$ training candidate cell (wherein k is an integer of 1 or more), is input to the classification function in the valid cell data set, and the input result is greater than a certain reference value TH, the terminal may determine that the classification function is proper. On the other hand, when the input result is equal to or less than TH, the terminal may determine that the classification function is improper, and may adjust at least one of the slope and bias of the classification function. For example, the terminal may adjust the slope and/or bias of the classification function lower than before.

In an example embodiment, the terminal may input the false cell data set into the classification function, and determine whether a condition of Formula 4 is satisfied.

$$f(x_j) < TH \qquad \text{[Formula 4]}$$

When $x_j$, $i^{th}$ data corresponding to a $i^{th}$ (wherein j is an integer of 1 or more) training candidate cell, is input to the classification function in the valid cell data set, and the input result is less than a certain reference value TH, the terminal may determine that the classification function is proper. On the other hand, when the input result is equal to or greater than TH, the terminal may determine that the classification function is improper, and adjust at least one of the slope and/or bias of the classification function. For example, the terminal may adjust the slope and/or bias of the classification function higher than before.

Referring further to FIG. 8B, the terminal may input the $k^{th}$ data corresponding to the $k^{th}$ training candidate cell in the valid cell data set into the classifier (S321a). According to an example embodiment, 'k' and T are initialized to have a value of '1' prior to performing the operations depicted in FIG. 8B). The terminal may determine whether the output of the classifier in response to the $k^{th}$ data meets (e.g., satisfies) the first reference (S322a). When a result of operation S322a is 'No', the terminal may adjust at least one parameter in the classification function (S323a) and proceed to operation S324a. Otherwise, when the result of operation S322a is 'Yes', the terminal may determine whether 'p1' that is a total number of training candidate cells corresponding to the valid cell data set is the same as 'k' (S324a). When a result of operation S324a is 'No', the terminal may count up (e.g., increment) 'k' (S325a) and then operation S321a may follow (e.g., repeat). Otherwise, when the result of operation S324a is 'Yes', the terminal may input the $j^{th}$ data corresponding to the $j^{th}$ training candidate cell in the false cell data set into the classifier (S321b). The terminal may determine whether the output of the classifier in response to the $j^{th}$ data meets (e.g., satisfies) the second reference (S322b). When a result of operation S322b is 'No', the terminal may adjust at least one parameter in the classification function (S323b) and proceed to operation S324b. Otherwise, when the result of operation S322b is 'Yes', the terminal may determine whether 'p2' that is a total number of training candidate cells corresponding to the false cell data set is the same as 'j' (S324b). When a result of operation S324b is 'No', the terminal may count up (e.g., increment) 'j' (S325b), and then operation S321b may follow (e.g., repeat). Otherwise, when the result of operation S324b is 'Yes', the terminal may complete the updating operation of the classifier (S326). According to an example embodiment, the first reference may correspond to an upper value (e.g., upper limit and/or upper threshold) of the slope of the classification function, and the second reference may correspond to a lower value (e.g., lower limit and/or lower threshold) of the slope of the classification function.

Figure 9:
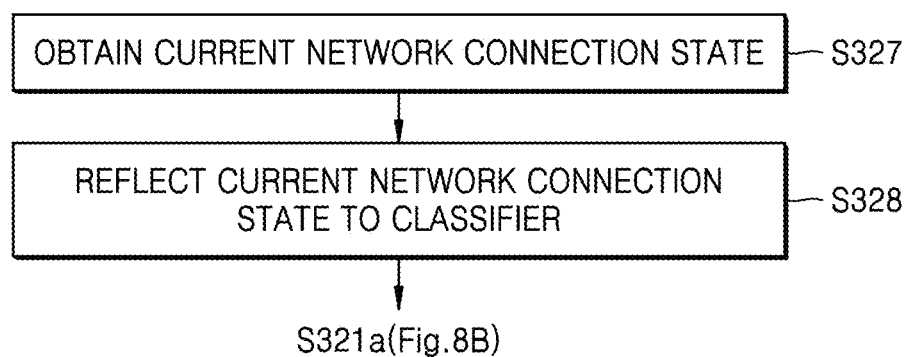
FIG. 9 is a flowchart of operation S300 in FIG. 4 in detail, according to an example embodiment.

FIG. 9 is a detailed flowchart of operation S300 in FIG. 4, according to an example embodiment.

Referring to FIG. 9, the terminal may obtain a current network connection state (S327). For example, the terminal may recognize whether the current network connection state is a network connection start state or a handover state. The terminal may reflect the current network connection state to the classifier (S328). For example, the terminal may reflect the current network connection state of the terminal to the classifier by performing the pre-processing operation on the valid cell data set and the false cell data set according to the current network connection state.

Figure 10A:
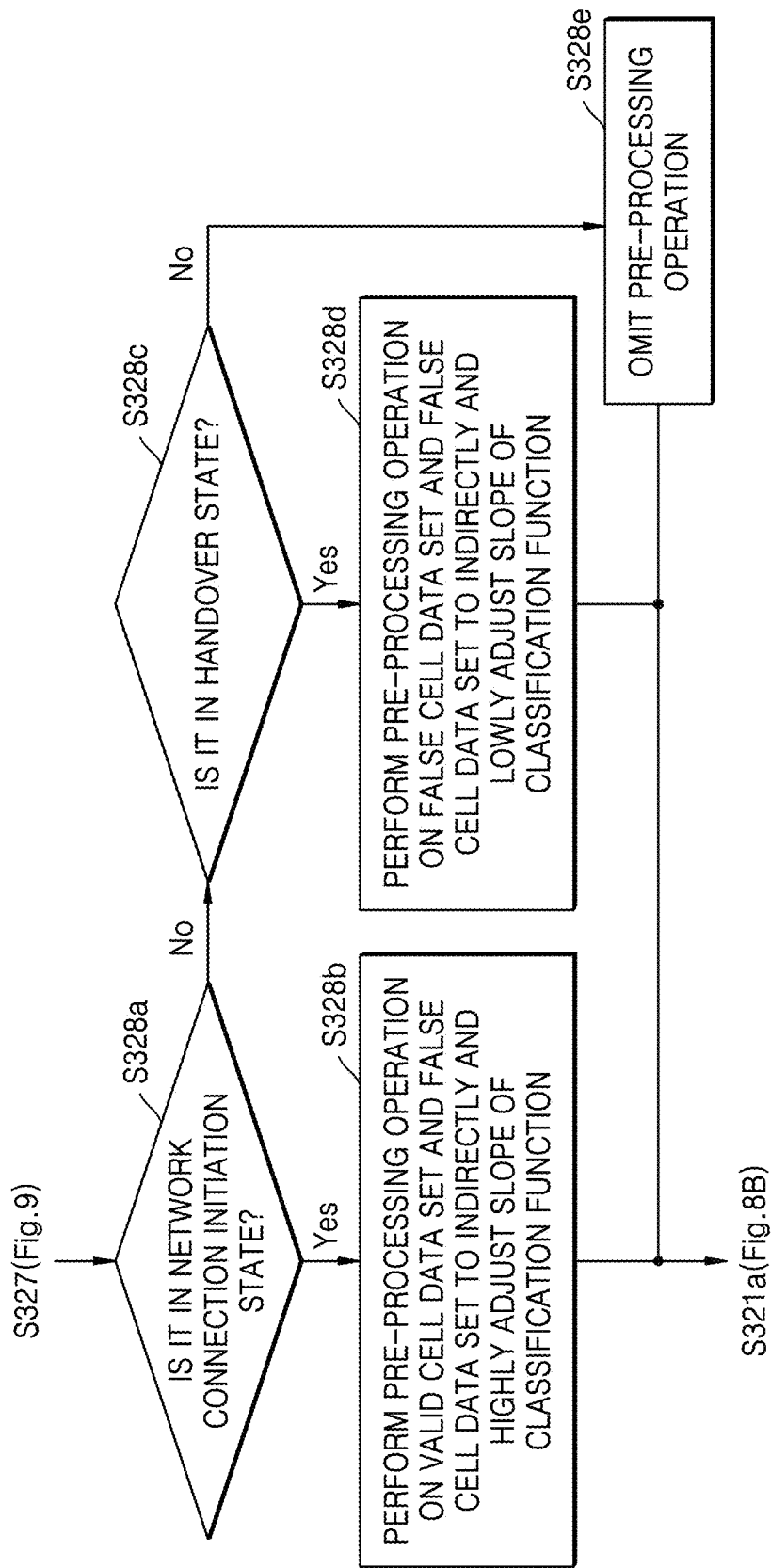
FIG. 10A is a flowchart of operation S328 in FIG. 9 in detail, according to an example embodiment.
Figure 10B:
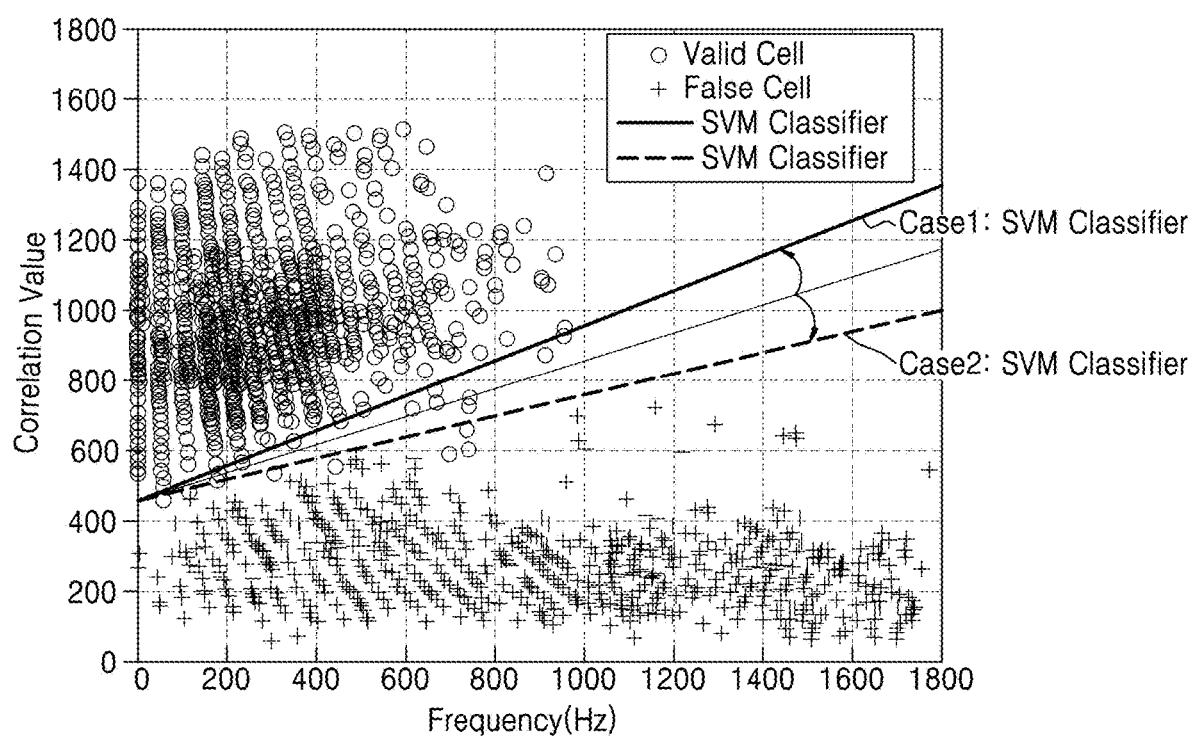
FIG. 10B is a graph for explaining an example embodiment disclosed in FIG. 10A.

FIG. 10A is a detailed flowchart of operation S328 in FIG. 9, according to an example embodiment, and FIG. 10B is a graph for explaining an example embodiment disclosed in FIG. 10A.

Referring to FIG. 10A, after operation S327 in FIG. 9, the terminal may determine whether the current network connection state is the network connection start state (S328a). When a result of operation S328a is 'Yes', the terminal may perform a pre-processing operation on the valid cell data set and the false cell data set to adjust indirectly and higher the slope of the classification function (S328b). Otherwise, when the result of operation S328c is 'No', the terminal may determine whether the current network connection state is the handover state (S328c). When a result of operation S328c is 'Yes', the terminal may perform the pre-processing operation on the valid cell data set and the false cell data set to adjust indirectly and lower the slope of the classification function (S328d). Otherwise, when the result of operation S328c is 'No', the terminal may omit the pre-processing operation (S328e). Hereinafter, operation S321a in FIG. 8B may follow.

Referring further to FIG. 10B, the terminal may indirectly adjust the slope of the classification function corresponding to the SVM classifier according to the current network connection state. For example, when the terminal is in a network connection start state as in a first case (Case1), the terminal may perform a first pre-processing operation on the valid cell data set and the false cell data set so that the slope of the classification function corresponding to the SVM classifier may be indirectly increased. In addition, when the terminal is in a handover state as in a second case (Case2), the terminal may perform a second pre-processing operation on the valid cell data set and the false cell data set so that the slope of the classification function corresponding to the SVM classifier may be indirectly decreased.

Although an example embodiment in which the terminal indirectly adjusts at least one parameter of the classification function of the classifier by pre-processing the valid cell data set and the false cell data set based on the current network connection state has been described, this is merely an example embodiment and an example embodiment is not limited thereto. In an example embodiment, the terminal may directly adjust at least one parameter of the classification function based on the current network connection state.

Figure 11A:
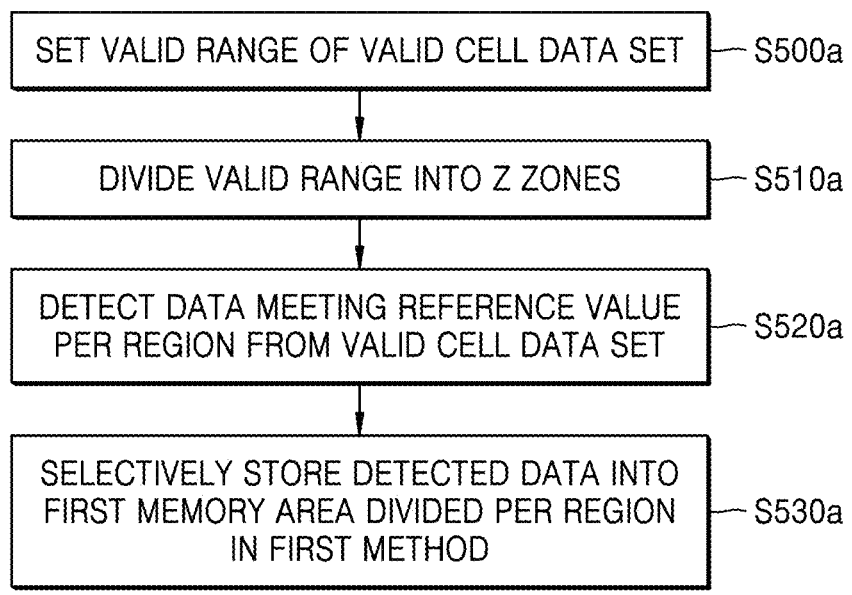
FIGS. 11A and 11B are flowcharts for explaining a storing method of a valid cell data set and a false cell data set of a terminal considering a limited storing capacity of a memory, respectively, according to an example embodiment.
Figure 11B:
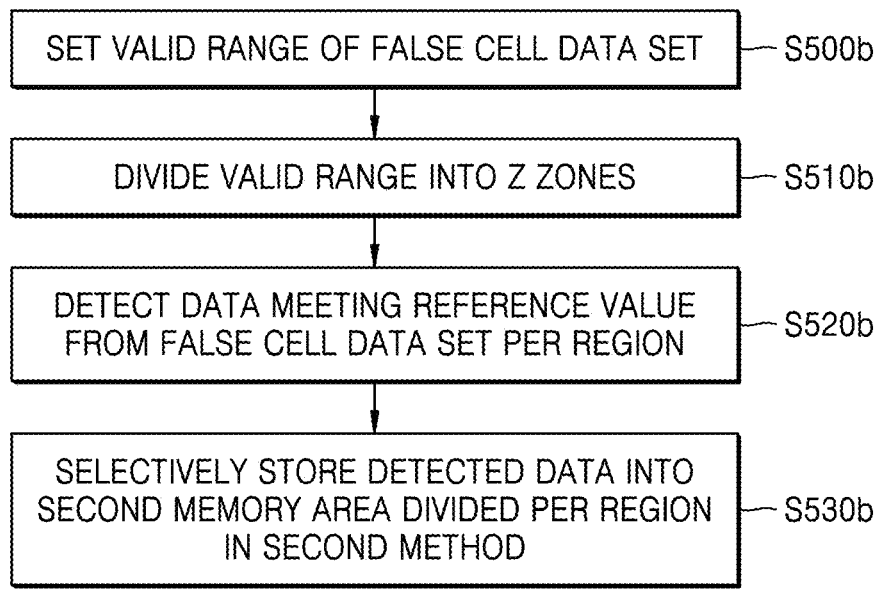

FIGS. 11A and 11B are flowcharts of a storing method of the valid cell data set and the false cell data set of a terminal considering a limited storing capacity of a memory, respectively, according to an example embodiment.

Referring to FIG. 11A, the terminal may set a valid range of the valid cell data set (S500a). For example, as described above with reference to FIG. 8A, when the valid cell data set includes the magnitude of correlation between the received signal and the reference signal, and the phase determined from the real component and the imaginary component of the correlation, the valid range may be set based on the phase. The terminal may divide the valid range into z (wherein, z is an integer of 1 or more) regions (e.g., zones) (S510a). The terminal may extract data corresponding to each region from the valid cell data set (S520a). According to an example embodiment, the terminal may extract the data including detecting data in each region from the valid cell data set that meets a reference value. The terminal may selectively store the extracted data in a first memory area divided for each region in a first method (S530a).

Referring to FIG. 11B, the terminal may set a valid range of the false cell data set (S500b). The terminal may divide the valid range into z regions (S510b). However, operations S500b and S510b may be omitted when results of operations S500a and S510a in FIG. 11A are used. The terminal may extract data corresponding to each region from the false cell data set (S520b). According to an example embodiment, the terminal may extract the data including detecting data in each region from the false cell data set that meets a reference value. The terminal may selectively store the extracted data in a second memory area divided for each region in a second method (S530b).

Operations S500a through S530a and operations S500b through S530b may be performed after operation S320 in FIG. 7A, and the terminal may perform operation S330 in FIG. 7A by using the valid cell data set and the false cell data set stored in the first memory area and the second memory area, respectively.

Figures 12, 13:
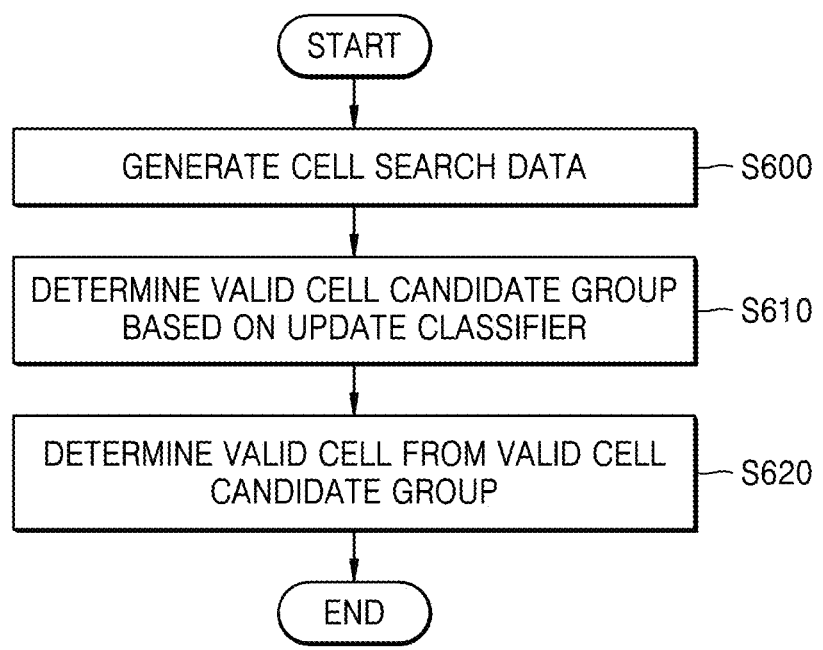
FIG. 12 is a diagram for explaining in detail a data storing method of a terminal, according to an example embodiment.
FIG. 13 is a diagram for explaining a cell searching method of a terminal, according to an example embodiment.

Referring further to FIG. 12, when the terminal stores a valid cell data set VCDS in a first memory area MA1, the first memory area MA1 may be divided into z regions, or first through $z^{th}$ regions R1 through Rz, and the valid cell data set VCDS may be stored as data cell data, that is, $C\_11a$ through $C\_1ta$, $C\_21a$ through $C\_2ta$, . . . , $C\_z1a$ through $C\_zta$, each of which corresponds to each zone (e.g., region). For example, each of the first through zth zones (e.g., regions) R1 through Rz may have a limited space that stores only 't' data (e.g., bits, bytes, etc. of data) (wherein t is an integer of 2 or more), store data with high priority first by applying a certain priority, and delete data with relatively low priority without saving it. For example, when the data in the valid cell data set VCDS is input to the classification function, the terminal may estimate a degree of proximity between the input result that is output and the reference value TH in Formula 3 in FIG. 8A and determine a storage priority of the data. For example, the terminal may set the storage priority in the order of small correlation size included in the data in each of the first through z zones, that is, the first through $z^{th}$ zones R1 through Rz, and store the valid cell data set VCDS in the first memory area MA1.

The terminal may access the valid cell data set VCDS stored in the first memory area MA1 with reference to first through $t^{th}$ indexes Index_11 through Index_1t of the first memory area MA1, and use the accessed valid cell data set VCDS in the machine learning for updating the classifier.

When the terminal stores a false cell data set FCDS in a second memory area MA2, the second memory area MA2 may be divided into z zones (may also be referred to herein as regions), that is, the first through $z^{th}$ zones R1 through Rz, and each of the false cell data sets FCDS may be stored as data, that is, C_11b through C_1tb, C_21b through C_2tb, . . . , C_z1b through C_ztb, each of which corresponds to each zone. For example, each of the first through $z^{th}$ zones R1 through Rz may have a limited space that stores only 't' data (e.g., bits, bytes, etc. of data) (wherein t is an integer of 2 or more), store data with high priority first by applying a certain priority, and delete data with relatively low priority without saving it. For example, when the data in the false cell data set FCDS is input to the classification function, the terminal may estimate a degree of proximity between the input result that is output and the reference value TH in Formula 4 in FIG. 8A, and determine a storage priority of the data. For example, the terminal may set the storage priority in the order of large correlation size included in the data in each of z zones, that is, the first through $z^{th}$ zones R1 through Rz, and store the valid cell data set FCDS in the second memory area MA2.

The terminal may access the false cell data set FCDS stored in the second memory area MA2 with reference to first through $t^{th}$ indexes Index_21 through Index_2t of the second memory area MA2, and use the accessed false cell data set FCDS in the machine learning for updating the classifier.

FIG. 13 is a diagram of a cell searching method of a terminal, according to an example embodiment.

Referring to FIG. 13, the terminal may generate cell search data for cell searching (S600). For example, the terminal may receive synchronization signals from a plurality of cells and generate cell search data corresponding to each of the plurality of cells. The terminal may determine the valid cell candidate group based on the updated classifier by applying an example embodiment described with reference to FIGS. 1 through 12 (S610). As an example, the terminal may apply the cell search data to the updated classifier, and by classifying those meeting the condition of Formula 3 associated with FIG. 8A as the candidate cells, and those meeting the condition of Formula 4 associated with FIG. 8A as the false cells, may determine the valid cell candidate group. The terminal may determine one valid cell based on received power corresponding to each candidate cell from the valid cell candidate group (S620).

In an example embodiment, the terminal may perform the cell search operation including operations S600 through S620 in parallel with the classifier update operation, and may use the cell search data generated in operation S600 as the first cell search training data to update the classifier.

Figure 14:
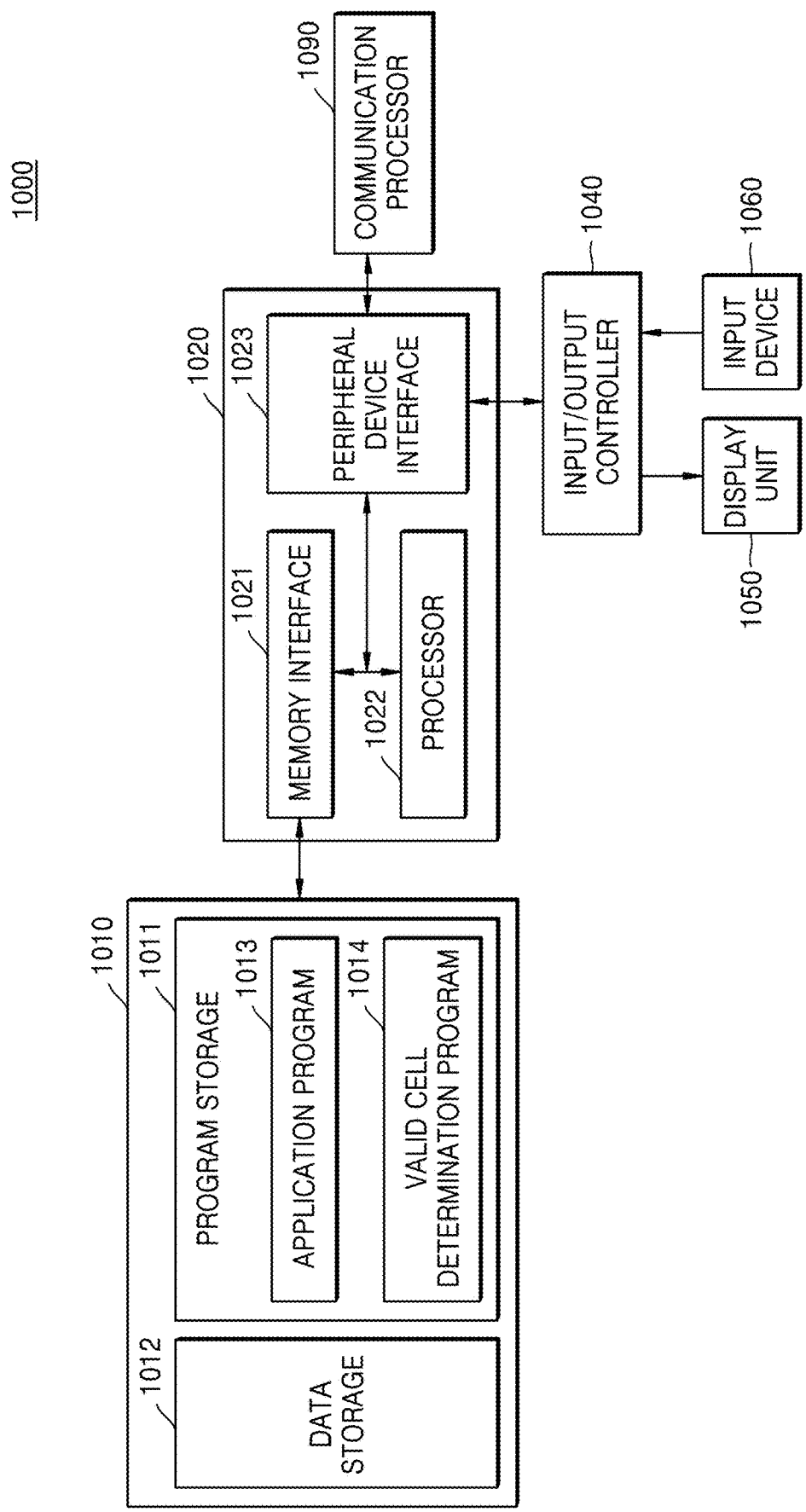
FIG. 14 is a block diagram of an electronic device according to an example embodiment.

FIG. 14 is a block diagram of an electronic device 1000, according to an example embodiment.

Referring to FIG. 14, the electronic device 1000 may include a memory 1010, a processor unit 1020, an input/output controller 1040, a display unit 1050, an input device 1060, and/or a communication processing unit 1090. The memory 1010 may exist in plural. Components are as follows.

The memory 1010 may include a program storage unit 1011 for storing programs for controlling an operation of the electronic device 1000 and a data storage unit 1012 for storing data generated during program execution. The data storage unit 1012 may store data used for operations of an application program 1013 and a valid cell determination program 1014. A program storage unit 1011 may include the application program 1013 and the valid cell differentiation program 1014. Here, programs included in the program storage unit 1011 may be sets of instructions and may be expressed as instruction sets.

The application program 1013 may include application programs operable in the electronic device 1000. In other words, the application program 1013 may include application instructions executed by a processor 1022. The valid cell differentiation program 1014 may control a classifier update operation according to an example embodiment of the present disclosure. In other words, the electronic device 1000 may generate the cell search training data by using the valid cell differentiation program 1014, and by using this, perform machine learning on a classifier capable of differentiating an optimal or desired valid cell even in various noise environments.

A peripheral device interface 1023 may control a connection of an input/output peripheral device of a base station to the processor 1022 and a memory interface 1021. The processor 1022 may control the base station to provide an applicable service by using at least one software program. In this case, the processor 1022 may execute at least one program stored in the memory 1010 to provide a service corresponding to an applicable program.

The input/output controller 1040 may provide an interface between an input/output device, such as the display unit 1050 and the input device 1060, and the peripheral device interface 1023. The display unit 1050 may display status information, input characters, moving pictures, still pictures, etc. For example, the display unit 1050 may display information about an application program executed by the processor 1022.

The input device 1060 may provide input data generated by a selection of the electronic device 1000 to the processor unit 1020 via the input/output controller 1040. In this case, the input device 1060 may include a keypad including at least one hardware button and a touchpad for sensing touch information. For example, the input device 1060 may provide via the input/output controller 1040 the touch information such as a touch, a touch movement, and a touch release that have been sensed by the touch pad to the processor 1022. The electronic device 1000 may include the communication processing unit 1090 that performs communication functions for voice communication and data communication.

Conventional devices and methods for communicating with a plurality of cells determine a valid cell based on a fixed correlation reference value. However, such fixed correlation reference values are unreliable and inaccurate in various noise environments (e.g., an increased noise environment of a weak signal electric field). Due to the lack of reliability and accuracy of these conventional devices and methods, the occurrence of attempted connections with invalid cells is increased, resulting in excessive resource consumption (e.g., power, processor, memory, delay, etc.).

However, an example embodiment provides for improved terminals and methods for communicating with a plurality of cells that determine a valid cell using an updatable classifier. The classifier may be updated to provide an improved performance in various noise environments (including an increased noise environment of a weak signal electric field). Accordingly, the improved terminals and methods overcome the deficiencies of the conventional devices and methods to provide improved reliability and accuracy and, thus, provide reduced the excessive resource consumption (e.g., power, processor, memory, delay, etc.) in comparison to the conventional devices and methods.

According to an example embodiment, operations described herein as being performed by the wireless communication system 1, the first through seventh cells 10 through 70, the terminal 100, the RFIC 120, the signal detector 130, the cell search controller 140, the classifier 150, the processor 170, the training data collector 142, the data pre-processor 144, the learning machine 146, the classifier updater 148, the electronic device 1000, the processor unit 1020, the input/output controller 1040, the communication processing unit 1090, the processor 1022, the peripheral device interface 1023 and/or the memory interface 1021 may be performed by processing circuitry.

According to an example embodiment, one or both of the classifier 150 and/or the learning machine 146 may be implemented using separate processing circuitry from the processing circuitry used to implement the terminal 100, the RFIC 120, the signal detector 130, the cell search controller 140, the processor 170, the training data collector 142, the data pre-processor 144, the classifier updater 148, the electronic device 1000, the processor unit 1020, the input/output controller 1040, the communication processing unit 1090, the processor 1022, the peripheral device interface 1023 and/or the memory interface 1021. For example, the classifier 150 may be implemented using classifier processing circuitry, and/or the learning machine 145 may be implemented using learning machine processing circuitry. According to an example embodiment, all of terminal 100, the RFIC 120, the signal detector 130, the cell search controller 140, the classifier 150, the processor 170, the training data collector 142, the data pre-processor 144, the learning machine 146, the classifier updater 148, the electronic device 1000, the processor unit 1020, the input/output controller 1040, the communication processing unit 1090, the processor 1022, the peripheral device interface 1023 and the memory interface 1021 may be implemented by the same processing circuitry (e.g., processing circuitry inside the terminal 100).

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with an example embodiment disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

An example embodiment may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

While an example embodiment has been particularly shown and described with reference to examples thereof, it will be understood that various changes in form and details may be made therein without departing from the spirit and scope of the following claims.

What is claimed is:

1. An operating method of a terminal configured to communicate with at least one of a plurality of cells, the method comprising:
generating first cell search training data for the plurality of cells;
determining at least one training candidate cell based on the first cell search training data;
updating at least one parameter of a classification function based on second cell search training data among the first cell search training data and network information about the terminal to obtain an updated classification function, the second cell search training data corresponding to the at least one training candidate cell; and
determining a valid cell among the plurality of cells based on the updated classification function,
wherein
the network information about the terminal includes a current network connection state of the terminal; and
the updating the at least one parameter of the classification function updates the at least one parameter of the classification function based on the current network connection state of the terminal.

2. The method of claim 1, wherein the first cell search training data comprises:
a correlation between a received signal of each of the plurality of cells and a reference signal,
a magnitude of the correlation, and
a phase obtained from the correlation.

3. The method of claim 1, wherein the determining the at least one training candidate cell comprises:
determining whether a magnitude of a correlation between a received signal of each of the plurality of cells and a reference signal meets a reference value to obtain a determination result, the correlation between the received signal of each of the plurality of cells and the reference signal being included in the first cell search training data; and determining the at least one training candidate cell from among the plurality of cells based on the determination result.

4. The method of claim 1, wherein
the network information about the terminal includes information about a cell currently connected to the terminal among the plurality of cells; and
the updating the at least one parameter of the classification function includes
classifying the second cell search training data into a valid cell data set and a false cell data set based on the information about the cell currently connected to the terminal,
applying the valid cell data set and the false cell data set to the classification function to obtain an applying result, and
updating the at least one parameter of the classification function based on the applying result.

5. The method of claim 4, wherein
the at least one training candidate cell includes a plurality of training candidate cells; and
the classifying the second cell search training data includes
classifying a first portion of the second cell search training data corresponding to a first training candidate cell among the plurality of training candidate cells having an ID matching an ID of the cell currently connected to the terminal into the valid cell data set, or
classifying a second portion of the second cell search training data corresponding to a second training candidate cell among the plurality of training candidate cells having an ID not matching the ID of the cell currently connected to the terminal into the false cell data set.

6. The method of claim 4, wherein the applying the valid cell data set and the false cell data set to the classification function comprises:
generating a first output by inputting the valid cell data set to the classification function; and
generating a second output by inputting the false cell data set to the classification function.

7. The method of claim 6, wherein the updating the at least one parameter of the classification function based on the applying result comprises:
adjusting the at least one parameter of the classification function based on whether the first output satisfies a first reference; and
adjusting the at least one parameter of the classification function based on whether the second output satisfies a second reference.

8. The method of claim 7, wherein the at least one parameter of the classification function comprises at least one of a slope of the classification function or a bias of the classification function.

9. The method of claim 4, wherein the classifying the second cell search training data classifies the second cell search training data into the false cell data set based on a network electric field between the terminal and the cell currently connected to the terminal being equal to or greater than a reference electric field.

10. The method of claim 4, further comprising:
storing data among the valid cell data set in a first memory region of the terminal based on proximity to a classification reference of the classification function; and
storing data among the false cell data set in a second memory region of the terminal based on proximity to the classification reference.

11. The method of claim 1, wherein the determining a valid cell among the plurality of cells comprises:
generating cell search data for the plurality of cells;
determining a valid cell candidate group from among the plurality of cells based on the cell search data and the updated classification function; and
determining the valid cell from among the valid cell candidate group.

12. The method of claim 11, wherein the cell search data is used as updated first cell search training data to update the at least one parameter of the classification function.

13. The method of claim 11, wherein the generating the first cell search training data is periodically performed separately from the generating the cell search data.

14. The method of claim 1, further comprising:
initializing the classification function based on initial cell search training data stored in a memory of the terminal.

15. An operating method of a terminal configured to communicate with at least one of a plurality of cells, the method comprising:
generating first cell search training data for the plurality of cells;
determining at least one training candidate cell based on the first cell search training data;
updating a classification based on second cell search training data among the first cell search training data and network information about the terminal to obtain an updated classification, the second cell search training data corresponding to the at least one training candidate cell; and
determining a valid cell among the plurality of cells based on the updated classification,
wherein
the network information about the terminal includes a current network connection state of the terminal; and
the updating the classification updates the classification based on the current network connection state of the terminal,
wherein the current network connection state of the terminal includes at least one of a network connection start state of the terminal or a handover state of the terminal.

* * * * *